United States Patent [19]
Hlava

[11] Patent Number: 4,792,106
[45] Date of Patent: Dec. 20, 1988

[54] MAGNETIC BAIL

[75] Inventor: Lorens G. Hlava, Tulsa, Okla.

[73] Assignee: Zebco Corporation, Tulsa, Okla.

[21] Appl. No.: 75,441

[22] Filed: Jul. 20, 1987

[51] Int. Cl.$^4$ .............................................. A01K 89/01
[52] U.S. Cl. ............................................... 242/84.2 G
[58] Field of Search .................. 242/84.2 G, 84.2 F, 242/84.2 R, 84.21 R

[56] References Cited

U.S. PATENT DOCUMENTS

| 2,762,579 | 9/1956 | Mauborgne | 242/84.2 G |
| 2,942,798 | 6/1960 | Alinari | 242/84.2 G |
| 3,550,874 | 12/1970 | Sarah | 242/84.2 G |
| 4,162,048 | 7/1979 | Sazaki | 242/84.2 G |
| 4,426,045 | 1/1984 | Gifford | 242/84.2 G |
| 4,676,450 | 6/1987 | Carpenter et al. | 242/84.2 G |

FOREIGN PATENT DOCUMENTS

| 135983 | 6/1952 | Sweden | 242/84.2 G |

Primary Examiner—Stuart S. Levy
Assistant Examiner—Joseph J. Hail, III
Attorney, Agent, or Firm—Wood, Dalton, Phillips, Mason & Rowe

[57] ABSTRACT

The invention comprehends an improvement in a spinning style fishing reel of the type having a line-carrying spool, a rotor housing, a crank handle for rotating the rotor housing about an axis, a bail carried on a bail arm, and structure mounting the bail arm for movement relative to the rotor housing selectively between a cast position, wherein line can be paid out of the spool, and a retrieve position, wherein line can be directed onto the spool as the rotor housing is operated by the crank handle. The improvement resides in structure for driving the bail arm into each of the cast and retrieve positions and for keeping the bail arm so positioned. The structure that accomplishes this end according to the invention consists of cooperating structures on the bail arm and rotor housing that are mutually attractive approaching and in each of the cast and retrieve positions.

12 Claims, 1 Drawing Sheet

U.S. Patent  Dec. 20, 1988  4,792,106
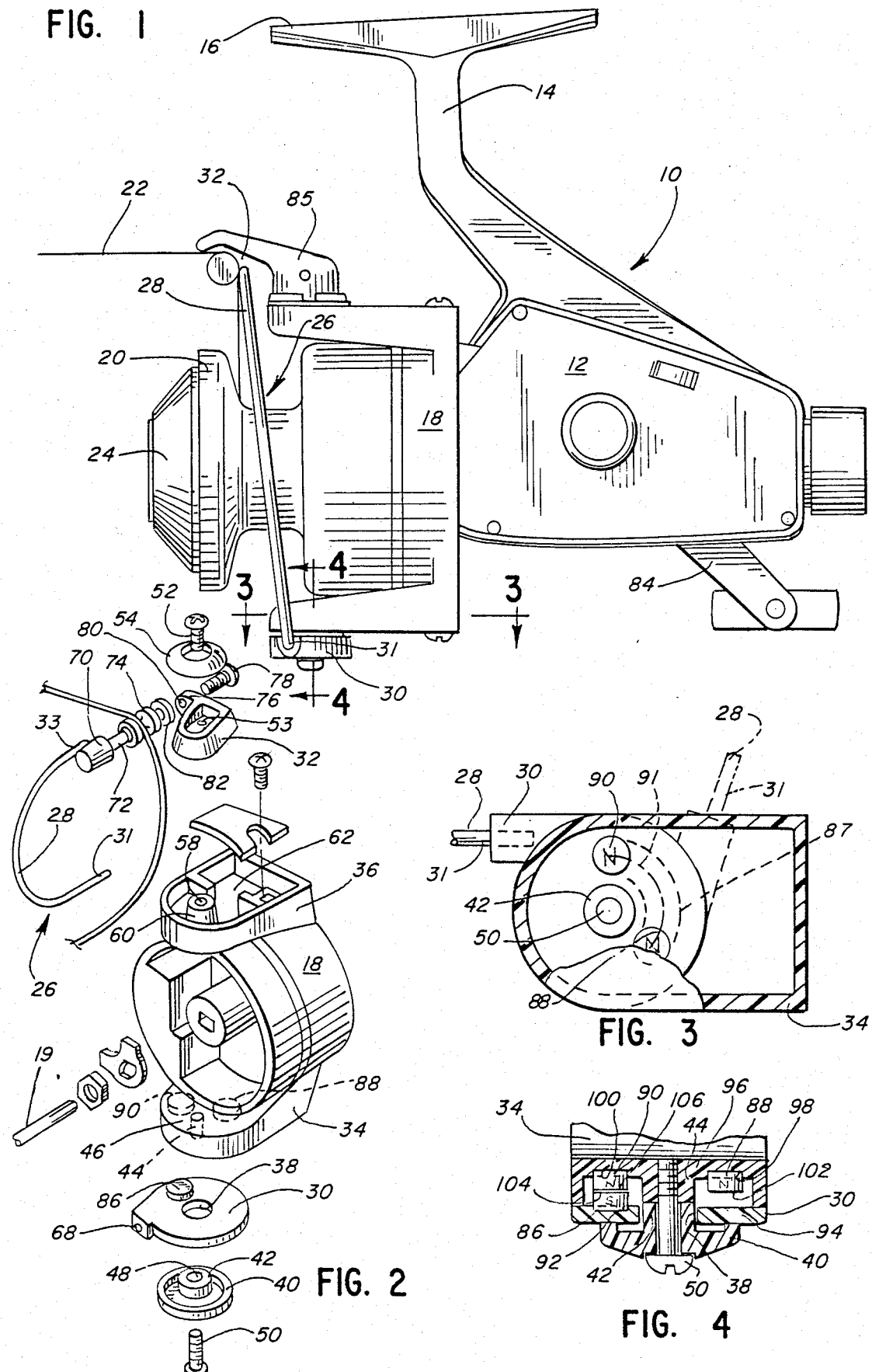

MAGNETIC BAIL

BACKGROUND OF THE INVENTION

1. Field of the Invention

This invention relates to spinning style fishing reels with pivotable bails and, more particularly, to structure for maintaining the bail selectively in each of its "cast" and "retrieve" positions.

2. Background Art

A typical spinning style fishing reel has a main casing which carries a rotor housing that is rotatable through the operation of a crank handle. The rotor housing has an associated bail assembly consisting of a U-shaped wire bail with arms at its free ends. The bail arms and bail are rotatable relative to the rotor housing about an axis between a cast position, wherein line can be freely paid out of a line-carrying spool, and a retrieve position, wherein line is drawn by the bail assembly over the spool as the rotor housing is operated. The spool reciprocates in a fore and aft direction concurrently with rotation of the rotor housing and associated bail assembly so that retrieved line is evenly distributed on the spool.

An overcenter spring arrangement is commonly used to drive the bail and bail arm into each of the cast and retrieve positions. Two different spring arrangements impart a rotative force to the bail arm. In one, the coil spring is arranged with its axis parallel to the rotational axis of the bail arm and loaded between the bail arm and rotor housing by twisting the spring about its axis. In the other, the spring is compressed lengthwise between the bail arm and rotor housing and lies transversely to the rotational axis of the rotor arm.

The above conventional structures have the principal drawback that the springs tend to fatigue and frequently break in normal operation, thereby making the bail inoperable. Also, after prolonged use, the springs tend to lose memory, which may result in the spring force being inadequate to positively drive the bail arm into the cast and retrieve positions. Further, the assembly process is complicated by having to install the spring during assembly, which is a fairly delicate operation. Still further, when the reel is disassembled, one faces the possibility of losing the spring or another of the numerous, separable parts associated with the conventional overcenter biasing structure.

SUMMARY OF THE INVENTION

The present invention is specifically directed to overcoming the above enumerated problems in a novel and simple manner.

The invention comprehends an improvement in a spinning style fishing reel of the type having a line-carrying spool, a rotor housing, a crank handle for rotating the rotor housing about an axis, a bail carried on a bail arm, and means mounting the bail arm for movement relative to the rotor housing selectively between a cast position, wherein line can be paid out of the spool, and a retrieve position, wherein line can be directed onto the spool as the rotor housing is operated by the crank handle.

The improvement resides in structure for driving the bail arm into each of the cast and retrieve positions and for keeping the bail arm so positioned. The structure that accomplishes this end according to the invention consists of cooperating structures on the bail arm and rotor housing that are mutually attractive approaching and in each of the cast and retrieve positions.

In a preferred form, a first magnet with one particular polarity on one facing surface is provided on either the bail arm or on the rotor housing and second and third magnetic poles of a polarity the same as each other but which polarity is opposite the polarity of the first magnet, or metal attractive to the first magnetic pole, are provided on the other of the bail arm or rotor housing.

In a preferred form of the invention, the bail arm is rotatable about an axis transverse to the rotational axis of the rotor housing. The first magnet with one particular polarity and the second and third magnetic poles of opposite polarity are spaced from the rotational axis of the bail arm and are so located that the first magnet of one polarity aligns next to and attracts the second magnetic pole of opposite polarity in the cast position and aligns next to and attracts the third magnetic pole of opposite polarity in the retrieve position. As the bail arm approaches each of the cast and retrieve positions, the second and third magnetic poles are attracted with a progressively increasing force due to the magnetic fields until the maximum attraction occurs with the first magnet with one polarity and the second and tihrd magnetic poles with opposite polarity in proximate, facing relationship, corresponding to the cast and retrieve positions. The attractive force between the first magnet of one polarity and the second and third magnetic poles with opposite polarity produces a progressively increasing torque on the bail arm as the bail arm approaches each of the cast and retrieve positions.

In a preferred form, the rotor housing and bail arm each have a wall, with the two walls residing adjacent to each other throughout the range of movement of the bail arm. Magnets are attached fixedly to the walls and the poles of the magnets are arranged so that opposite poles face each other in each of the cast and retrieve positions.

The foregoing arrangement simulates the action of an overcenter spring arrangement and accounts for a positive movement of the bail arm precisely to each of the retrieve and cast positions and a secure holding of the bail arm in each of the cast and retrieve positions. At the same time, there are no loose parts that can be lost when the reel is disassembled as when repairs are being carried out. With the inventive structure, springs commonly used in the prior art are eliminated. The magnets will function efficiently and are not susceptible to wearing out after prolonged used as are springs, and the like.

BRIEF DESCRIPTION OF THE DRAWINGS

FIG. 1 is a side elevation view of a spinning style fishing reel with a rotor housing having an associated magnetic bail assembly according to the present invention;

FIG. 2 is an exploded perspective view of the rotor housing and bail assembly of FIG. 1;

FIG. 3 is an enlarged, sectional view of the connection between an arm on the bail and rotor housing taken along line 3—3 of FIG. 1;

FIG. 4 is an enlarged, sectional view of the connection between the bail arm and rotor housing taken along line 4—4 of FIG. 1.

DESCRIPTION OF THE PREFERRED EMBODIMENT

In FIGS. 1 and 2, a spinning reel is shown generally at 10, having incorporated therein a magnetic bail system according to the present invention. Only that structure necessary to an understanding of the present invention is described below. Details of the remainder of the reel structure are explained fully in U.S. Pat. No. 4,426,045.

The spinning reel 10 has a main casing 12 for the main reel operating mechanism, with an integral mounting stem 14 terminating in a foot 16 for connection in conventional manner to a fishing rod (not shown). At the forward portion of the casing 12, a rotor housing 18 is mounted for rotation about a lengthwise axis. A central shaft 19, extending lengthwise of the reel casing 12, has at its forward end a spool 20 upon which a supply of line 22 can be wound. A hub 24 secures the connection of the spool 20 to the shaft 19.

The rotor housing 18 has an associated bail assembly at 26 consisting of a wire bail 28, formed generally in the shape of a U, with the ends 31 and 33 connected with arms 30, 32. The arms 30, 32 are pivotally connected to two ears 34, 36, formed integrally with the rotor 18 at diametrically opposite positions thereon.

The arm 30 has a through bore 38 to facilitate mounting of the arm 30 on the ear 34. A cap 40 has an integral hub 42, which is passed through the bore 38 and into abutting relationship with a lug 44 on a wall 46 of the ear 34. The cap 40 has a through bore 48. The lug 44 is internally threaded so that with the hub 42 extended through the bore 38 and abutted with the lug 44, a screw 50 can be passed through the bore 48 and into the hub 44 to secure the connection of the arm 30 and rotor housing 18 so that the arm 30 is freely guidingly rotatable relative to the ear 34 about the hub 42.

Arm 32 is connected to ear 36 in somewhat similar fashion. A screw 42 is directed through an aperture 53 in an end cap 54, the arm 32 and into a threaded bore 58 in a lug 60 integrally formed with a wall 62 on the rotor housing ear 36.

The bail ends 31,33 are connected respectively to the arms 30, 32 and to the rotor housing ear 34 and ear 36. The bail end 31 is pressed into a bore 68 on the arm 30. The opposite bail end 33 has a bent end seated in a bore in fitting 70 having an associated pivot shaft 72, which has an axially extending, threaded bore. The pivot shaft 72 is directed through an hourglass-shaped line roller 74 and is held against a tab 76 on the arm 32 by a screw 78, which is passed through a bore 80 on the tab 76 and into the bore of shaft 72. A washer 82 is interposed between the tab 76 and the line roller 74. The bail arms 30, 32 are thus mounted for rotation about a common axis extending along the axis of the screws 50, 52 and extending transverse to the axis of the central shaft 19 running lengthwise of the reel 10.

Spinning reels have two well known optional features, one being a bail self-centering feature whereby a partial reverse turn on the crank handle will rotate the rotor and bail to a vertically oriented position which facilitates opening the bail for a cast. The second feature being an internal mechanism connected between the crank and the bail on the rotor whereby with the bail in the open or cast position immediately upon rotating the crank, the bail will be pivoted to the closed or retrieve position.

In FIG. 1, the reel is shown in the retrieve mode. To direct line onto the reel spool 20, a crank handle 84 is operated to rotate the rotor housing 18 and associated bail assembly 26 about the lengthwise axis of the shaft 19. As this occurs, the line 22, which is directed around the line roller 74, is drawn thereby in a circular path.

The spool 20 is caused to reciprocate in a fore and aft direction as the rotor housing 18 is operated. This results in the line being evenly distributed over the spool 20 from front to back thereon.

When it is desired to release the line 22 from the spool 20, as during a cast, the bail 28 is grasped by the user and manually reoriented by pivoting the bail about the axes of screws 50, 52 to the cast position shown generally in FIG. 2. In this position, the line roller 74 is pivoted away from the line so that the line can pay out freely from the spool 20. An optional quick release trigger 85 is shown in FIG. 1 to manipulate the bail 28 from the retrieve to the cast position. However, either a manual system or a quick release system is used in the same manner with the invention. Suitable stops (not shown) are provided to limit rotation of the bail at the extremes of travel i.e. the cast and retrieve positions. An exemplary pivoting range for the bail is on the order of 115°.

Once a desired amount of line has been released or cast the crank handle 84 is again operated. This causes the bail 28 to be pivoted from the cast position of FIG. 2 back towards the retrieve position of FIG. 1. The present invention is specifically directed to structure for both driving the bail into the cast and retrieve positions through the bail arms 30, 32 and maintaining the bail 28 in each of these positions. To accomplish this end, the present invention contemplates the use of three magnets 86, 88, 90, as shown clearly in FIGS. 2-4. It is contemplated that two magnets could be used with one of the magnets being semicircular in shape and having poles of the same polarity at the opposite ends of the semicircle. This structure is shown in dashed lines 87 superimposed on the two magnets 88, 90 in FIG. 3. Magnet 86 is seated in a countersunk bore 92 on a wall 94 on the arm 30. Magnets 88, 90 are held in place on a wall 96 on the rotor housing ear 34 in countersunk bores 98, 100 respectively. The magnets 86, 88, 90 are spaced equidistantly from the rotational axis of the bail arms 30, 32. The magnets 86, 88, 90 are arranged so that the magnet 86 is in coaxial relationship with magnet 90 with the bail assembly 26 in the cast position and so that the magnet 86 is in coaxial relationship with the magnet 88 with the bail assembly 26 in the retrieve position. The axial dimension of the magnets is chosen so that outwardly facing surfaces 102, 104, on magnets 88, 90, respectively, are parallel and can be selectively brought into close proximity to the facing surface 106 on magnet 86.

The poles of the magnets 86, 88, 90 are arranged so that the magnet 86 attracts magnet 90 in the cast position and magnet 86 attracts magnet 88 in the retrieve position. For example, the north pole is shown facing radially outwardly from the rotor housing 18 for each of the magnets 88, 90, while magnet 86 has its south pole facing radially inwardly. Magnets 88, 90 could be combined in one crescent or semicircular shaped magnet made of, for instance, a ceramic material barium ferrite, with north poles imprssed on the opposite ends of the crescent or semicircular shaped magnet. FIG. 3 shows in dashed lines such a magnet 87 superimposed in phantom on the two magnets showing. It should be noted that it is within the scope of the invention to substitute a magnetically attractive metal for either the magnet 86 or the magnets 88, 90. The bail assembly 26 would in that case operate in the same manner.

Upon the user operating the crank handle 24 with the bail assembly 26 in the cast position, the reel mechanism causes the bail arm 32 to be pivoted clockwise from the solid line position in FIG. 3 causing the magnet 86 to follow in a clockwise direction out of coaxial relationship with magnet 90 towards magnet 88 tracing a path shown by dotted line 91 in FIG. 3. As the magnet 86 approaches magnet 88, the magnetic field produced by each causes an attractive force to be developed which produces a torque on the arm 30 that increases until the magnets 86, 88 realize coaxial relationship, at which point the magnetic attractive force is the greatest, thereby positively holding the bail assembly 26 in the retrieve position. In the same fashion, as the bail 28 is moved out of the retrieve position, the magnet 86 moves away from magnet 88 and, as it approaches magnet 90, there is a progressively increasing attractive force between the magnets 86, 90 until the magnets are aligned and the bail is positively held in the cast position.

It can be seen that as the bail 28 approaches both the cast and retreive positions thereof, a progressively increasing force drives the bail into the cast and retrieve positions much the same as occurs with conventional overcenter spring arrangement. However, the need for a spring is obviated and thus there are no separable parts that might be lost on the arm 30 and ear 34 as in conventional designs. There is no direct action of one part against the other to produce the attractive force between the bail arm 30 and ear 34 that is converted to a torque on the arm 30. Thus breakage and wearing out of torque imparting parts will not occur. As long as the magnets retain their polarity, the reel will operate consistently regardless of the extent of use.

I claim:

1. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:
   cooperating mutually attractive means on the bail arm and rotor housing for magnetically urging movement of the bail arm selectively towards each of the cast and retrieve positions and for maintaining the bail arm in each of the cast and retrieve positions,
   whereby the bail arm is positively maintained in each of the cast and retrieve positions.

2. The improved fishing reel according to claim 1 wherein said bail arm has a first wall, the rotor housing has a second wall adjacent to the first wall, the means mounting the bail arm mount the first wall for pivoting movement relative to the second wall about a second axis, the cooperating attractive means are provided on the first and second walls at locations spaced from the second axis, and the attractive means is non-deformable as the bail arm moves between the cast and retrieve positions.

3. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:
   cooperating attractive means on the bail arm and rotor housing for urging movement of the bail arm selectively towards each of the cast and retrieve positions and for maintaining the bail arm in each of the cast and retrieve positions,
   said bail arm has a first wall, the rotor housing has a second wall adjacent to the first wall, the means mounting the bail arm mount the first wall for pivoting movement relative to the second wall about a second axis, the cooperating attractive means are provided on the first and second walls at locations spaced from the second axis and the cooperating attractive means comprise magnets.

4. The improved fishing reel according to claim 3 wherein said magnets are mounted to the first and second walls.

5. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:
   cooperating attractive means on the bail arm and rotor housing for urging movement of the bail arm selectively towards each of the cast and retrieve positions and for maintaining the bail arm in each of the cast and retrieve positions,
   wherein the cooperating attractive means comprises a first element having one polarity and being mounted on one of the bail arm and rotor housing, a second element having an opposite polarity on the other of the bail arm and rotor housing and aligned for mutual attraction with the first element with the bail arm in a cast position and a third element having an opposite polarity to the polarity of the first element and being on the other of the bail arm and rotor housing and aligned for mutual attraction with the first element with the bail arm in the retrieve position.

6. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:
   a first element on one of the rotor housing and bail arm;
   spaced second and third means on the other of the rotor housing and bail arm for respectively magnetically attracting the first element with the bail arm in the cast position and in the retrieve position and to resist movement of the bail arm with the bail in each of the cast and retrieve positions,
   wherein each point on the bail moves in a single plane as the bail arm moves between the cast and retrieve positions.

7. The improved fishing reel according to claim 6 wherein the means mounting the bail arm mount the bail arm for rotation about a second axis and the first element and second and third means are offset from said second axis.

8. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:

a first element on one of the rotor housing and bail arm; and spaced second and third means on the other of the rotor housing and bail arm for respectively attracting the first element with the bail arm in the cast position and in the retrieve position and to resist movement of the bail arm with the bail in each of the cast and retrieve positions, wherein at least one of the first element and the second and third means is a magnet.

9. An improved fishing reel of the type having a line-carrying spool, a rotor housing, a crank handle for rotating the rotor housing about an axis, a bail carried on a bail arm, and means mounting the bail arm for rotation about a second axis relative to the rotor housing selectively between a cast position wherein line can be fed off of the spool and a retrieve position wherein line can be directed onto the spool as the rotor housing is operated by the crank handle, the improvement comprising:

a first magnet on one of the bail arm and rotor housing and spaced radially from the second axis;

second means on the other of the bail arm and rotor housing and spaced from the second axis for developing an attractive force in cooperative with said first magnet parallel to the second axis to resist rotation of the bail arm about the second axis with the bail arm in a cast position; and third means on the other of the bail arm and rotor housing and spaced from the second axis for developing an attractive force in cooperation with said first magnet parallel to the second axis to resist rotation of the bail arm about the second axis with the bail arm in a retrieve position.

10. An improved fishing reel according to claim 9 wherein said second means and third means are the same magnetic polarity on a one piece magnet, said polarity being opposite the polarity of said first magnet and facing said first magnet.

11. An improved fishing reel of the type having a line-carrying spool, a rotor housing, a crank handle for rotating the rotor housing about an axis, a bail carried on a bail arm, and means mounting the bail arm for movement relative to the rotor housing selectively between a cast position wherein line can be paid out of the spool and a retrieve position wherein line can be directed onto the spool as the rotor housing is operated by the crank handle, the improvement comprising:

a first magnet on one of the rotor housing and bail arm, said magnet having a polarity facing from the one to the other of said rotor housing and bail arm;

a spaced second magnet on the other of the rotor housing and bail arm, said second magnet having two like spaced apart polarities facing from the one to the other of said rotor housing and bail arm for respectively attracting the first magnet with the bail arm in the cast position and in the retrieve position to resist movement of the bail arm with the bail in each of the cast and retrieve positions.

12. An improved fishing reel according to claim 11 wherein said second magnet is crescent shaped with the like polarities located at the end portions thereof.

* * * * *